United States Patent [19]
Sheffer

[11] Patent Number: 4,868,859
[45] Date of Patent: Sep. 19, 1989

[54] SUPERVISED, INTERACTIVE ALARM REPORTING SYSTEM

[75] Inventor: Eliezer A. Sheffer, Long Island, N.Y.
[73] Assignee: BT Telecom, Inc., Trenton, N.J.

[21] Appl. No.: 62,174
[22] Filed: Jun. 12, 1987
[51] Int. Cl.⁴ .......... H04M 11/04
[52] U.S. Cl. .......... 379/39; 379/59
[58] Field of Search .......... 379/37, 39, 40, 42–44, 379/46–51, 59, 60, 32, 33, 38

[56] References Cited

U.S. PATENT DOCUMENTS

| | | | |
|---|---|---|---|
| 3,686,439 | 8/1972 | Gerard . | |
| 3,711,647 | 1/1973 | Boyer . | |
| 3,786,502 | 1/1974 | Stendig et al. . | |
| 3,852,740 | 12/1974 | Haymes . | |
| 3,912,875 | 10/1975 | Katz . | |
| 3,914,692 | 10/1975 | Seaborn, Jr. . | |
| 4,012,596 | 3/1977 | West, Jr. et al. . | |
| 4,071,711 | 1/1978 | Beaupre et al. . | |
| 4,097,690 | 6/1978 | Kuntz et al. . | |
| 4,291,197 | 9/1981 | Yonaga . | |
| 4,369,516 | 1/1983 | Byrns . | |
| 4,371,751 | 2/1983 | Hilligoss, Jr. et al. . | |
| 4,390,750 | 6/1983 | Bartelink . | |
| 4,394,540 | 7/1983 | Willis et al. . | |
| 4,442,320 | 4/1984 | James et al. | 379/42 |
| 4,465,904 | 8/1984 | Gottsegen et al. | 379/42 X |
| 4,521,643 | 6/1985 | Dupuis et al. | 379/50 X |
| 4,521,645 | 6/1985 | Carroll . | |
| 4,523,184 | 6/1985 | Abel . | |
| 4,555,592 | 11/1985 | Deinzer . | |
| 4,562,307 | 12/1985 | Bursztejn et al. . | |
| 4,568,800 | 2/1986 | Orikasa . | |
| 4,574,164 | 3/1986 | Orikasa . | |
| 4,577,182 | 3/1986 | Millsap et al. | 379/59 X |
| 4,641,127 | 2/1987 | Hogan et al. . | |
| 4,652,859 | 3/1987 | Van Wienen | 379/40 X |
| 4,658,096 | 4/1987 | West, Jr. et al. . | |
| 4,718,079 | 1/1988 | Rabito | 379/39 X |
| 4,718,080 | 1/1988 | Serrano et al. | 379/59 |
| 4,731,810 | 3/1988 | Watkins | 379/33 |
| 4,825,457 | 4/1989 | Lebowitz | 379/40 |

FOREIGN PATENT DOCUMENTS

| | | | |
|---|---|---|---|
| 55-77248 | 6/1980 | Japan | 379/39 |
| 60-247365 | 12/1985 | Japan | 379/39 |

OTHER PUBLICATIONS

*Security*, vol. 24, No. 5, May 1987, p. 18, "Cellular Communication Goes Off-Road to Transmit Alarms".
Sanchez, "Design of a Multiple Access Radio System for Rural Telephony", Nov. 1983, *Telecommunication Journal*, vol. 5-XI/1983, pp. 615–621.
Grandchamp, "EXLOCRA: Local Extension by Radio", Aug. 1982, *Telecommunication Journal*, vol. 49--VIII/1982, pp. 477–480.
Miyawaki et al., "Radio Subscriber System", Apr. 1979, *NEC Research & Development*, (Japan), No. 53, pp. 36–45.
Barresi et al., "The Problem of Radio Telephone Systems for Rural Subscribers", Jun. 1978, International Conf. on Comm., 4–7, Jun. 1978, pp. 41.5.1 to 41.5.5.
Komura et al., "Subscriber Radio Telephone System for Rural Areas", Apr. 1976, *Japan Telecommunication Review*, vol. 18, No. 2, pp. 94–100.
Hagen, "New Rural Radio Telephone Brings Normal Service to Near-Impossible Areas", Sep. 22, 1975, *Telephony*, vol. 189, No. 12, pp. 40–42, 46, 47.
Edwards, "Fixed Subscriber Radio Systems at V.H.F. and U.H.F.", Dec. 1972, *Proc. of Inst. Radio & Electronics Eng.*, (Australia), vol. 33, No. 12, pp. 561–572.

*Primary Examiner*—Keith E. George
*Attorney, Agent, or Firm*—Weiser & Stapler

[57] ABSTRACT

A supervised, interactive alarm reporting system includes a local terminal comprised of a supervised derived channel communicator, and a one-way radio communicator (preferably via the cellular telephone network), which are connected by a control unit which provides for interactive operation of the derived channel unit and the radio transmitter according to alarm conditions which may arise at the premises, and the existing condition of the equipment comprising the local terminal unit. The local terminal unit is capable of communicating with a central monitoring facility, or mobile units (patrol vehicles or service vehicles) associated with the central monitoring facility, for enhanced security of the monitored premises. Also an alarm reporting system for a mobile site including a local terminal which communicates with a monitoring facility (fixed or mobile) via the cellular telephone network.

25 Claims, 4 Drawing Sheets

SUPERVISED, INTERACTIVE ALARM REPORTING SYSTEM

BACKGROUND OF THE INVENTION

The present invention relates generally to remote alarm reporting systems, and in particular, to a supervised alarm reporting system which is capable of providing enhanced security.

A variety of security systems have been developed to satisfy the ever-increasing need for the remote monitoring of various premises, including both business and home applications. Generally, this is accomplished by providing the premises with a local terminal, or reporting unit, which is capable of receiving signals from various sensors placed throughout the premises, interpreting such signals, and interacting with a central office or station to advise the central facility of potential alarm conditions. The sensors communicating with the local terminal may be used to provide any of a variety of functions, including smoke and fire detection, the detection of intruders (i.e., possible break-ins), or to monitor local conditions such as temperature, pressure or other desired parameters. The corresponding central facility might constitute any of a number of private companies which have been established for security or other monitoring purposes. The key to the effectiveness and integrity of the system provided often depends upon the means which are used to establish communications between the local terminal provided at the premises and the monitoring equipment provided at the central facility. A number of systems have therefore been devised to provide such communications.

Perhaps the most common means of communication between the local terminal and the central facility is the switched network telephone lines which connect these two locations. The local terminal provided at the remote premises is connected to the switched telephone line network associated with the premises, to establish remote communications. Often, such communications are initiated by the local terminal, which automatically dials the central facility when a potential alarm event has been detected (one-way communications). While such communications may be accomplished by voice (a recorded message), the current trend is for such communications to be accomplished through digital communications, which are capable of providing more detailed information regarding the potential alarm condition. Communications via the switched telephone line network are popular because they are inexpensive, well proven and reliable. Moreover, the switched telephone line network is already in place, readily accessible, and serviced by a third party. A cost effective security system results.

However, such systems provide only limited security because of the free accessibility of others to the switched network telephone lines. The lines are not secured, and may be cut either accidentally, or intentionally, severing the link between the local terminal and the central facility. In fact, periodic interruptions are generally necessitated by the testing requirements which are imposed by the utilities that install and service such telephone lines. Since in the case of one-way communications the central facility has no way of knowing whether or not the communicating lines are operational, it is possible for alarm conditions signaled by the local terminal to go undetected.

For this and other reasons, efforts were made to develop supervised communicating systems adaptable for use in connection with switched network telephone lines (two-way communications). Due to their manner of operation, such systems are capable of providing an indication as to the condition of the communicating telephone lines, as well as the local terminal. An example of such a system may be found with reference to U.S. Pat. No. 4,442,320, which describes the "Subscriber Terminal Unit" alarm reporting system of Base 10 Systems, Inc. Such alarm reporting systems, which are generally known as derived channel systems, modify the above described one-way system by providing means which allow the central facility to verify the integrity of the system, and the communicating telephone lines. In connection with the "Subscriber Terminal Unit" alarm reporting system, this is accomplished in two ways. First, the central facility is permitted to periodically interrogate the local terminal at the remote premises, to determine its status. In addition to indicating whether or not there are any alarm conditions, this also has the benefit of verifying that the communicating lines are intact. Second, there is additionally provided a tone, having a frequency below the audible range, which is transmitted by the local terminal at specified times. Again, in addition to the reporting function of this tone, this additionally provides a means for verifying the integrity of the communicating telephone lines.

Such derived channel systems therefore have the advantage of indicating whether or not the system is operational, and is properly reporting its condition. This avoids the potential "blackouts" inherent in one-way communicating systems, thereby serving to significantly enhance security.

However, this supervisory capability has been found to cause yet another difficulty. When, for whatever reason, the local terminal ceases to report its condition, the associated central facility is constrained to declare a break-in since it is not sure whether the cessation of operations results from an equipment failure, a test of the telephone lines by the local utility, or an actual break-in. This necessarily results in a significant number of false alarms, since equipment failures are inevitable, and since the utilities must periodically test their equipment. Such false alarms have led to a certain amount of apathy on the part of the police, and have even caused some police departments to limit the number of responses which they will make to calls received regarding a given premises.

Yet another system which is commonly used is the direct wire system. In this system, communications (either one-way or two-way) are established by a private (shared or dedicated) line running directly between the local terminal and the central monitoring facility. Since this system is no longer dependent upon the switched telephone line network, a greater degree of predictability is provided. In particular, there is no longer a need to account for third party testing of the communicating system. However, there is still presented the potential for interrupted communications to be the result of either an equipment failure, an accidental cutting of the line, or an actual break-in, again leading to the above-described problems. The central facility must again take action based upon assumed information, declaring a break-in when in fact their might be none. Moreover, any increases in security which are provided by such a system are counterbalanced by significant increases in cost, since the communicating lines of the system require special installation as well as dedicated service and maintenance.

Yet another system involves the replacement of wired lines with radio communications. While it is significantly more difficult to "cut" radio communications between the local terminal and the central facility, such jamming techniques do exist. Consequently, a one-way radio system, although more reliable than a wired one-way system, will still suffer from the disadvantage that the central facility is not made aware of whether or not the system is in operation. A two-way radio system would enable a supervisory function to be added. However, this requires continuous two-way communications by way of radio. Such systems are therefore subject to significant limitations in view of the regulatory constraints which are in place regarding the use of radio waves, and in terms of the number of frequencies which are available for use in a particular system (limiting the number of possible installations). Yet another factor to consider is the significant cost of installation and maintenance which such a system necessarily entails.

Moreover, a consideration which is common to each of the above-described systems is that, irrespective of the elegance of the system, discontinued signals from the local terminal cannot be interpreted. This generally necessitates the declaration of a break-in when in fact there may be none. Once the line of communications (wired or radio) has been cut, it is not possible for the central facility to determine the exact nature of the problem. Because of this, a significant potential exists for police to be dispatched to a particular premises for no reason. Still further complicating matters is that in connection with systems which are capable of reporting more than one type of alarm condition, it is possible for the wrong remedy to be dispatched to the premises, since the exact nature of the alarm cannot be determined. For example, the police may be dispatched to a premises when in fact the discontinued signals result from a fire, a medical emergency, or a needed repair. It is clearly unreasonable to dispatch all such remedies to a given premises every time communications with a particular premises cease.

For this reason, efforts have been made to develop dual technology systems which combine two of the above-described systems in a single unit. Generally, this is accomplished by combining a wired system and a radio system. If either unit ceases to operate, the remaining unit operates to convey information to the central facility. However, unless the wired system and the radio system are supervised, the potential still exists for many of the above-described problems to arise. Ultimately, this can be remedied by providing a supervised wired system and a supervised radio system. However, while providing significant security, such a system is prohibitively expensive, and still suffers from the significant limitations imposed by the need for constant two-way radio communications.

SUMMARY OF THE INVENTION

It is therefore the primary object of the present invention to provide a supervised, interactive alarm reporting system which is capable of providing a high degree of security without suffering from the significant drawbacks of previously available systems.

It is also an object of the present invention to provide a supervised, interactive alarm reporting system which is capable of indicating the exact nature of a signaled event, even after significant failure of or tampering with the system.

It is also an object of the present invention to provide a supervised, interactive alarm reporting system which is not significantly limited in terms of the number of subscribers which may be connected to the system, as a result of technical or regulatory constraints.

It is also an object of the present invention to provide a supervised, interactive alarm reporting system having the foregoing capabilities, yet which is inexpensive to install, maintain and service.

It is also an object of the present invention to provide a supervised, interactive alarm reporting system which is capable of being adapted to and/or added to existing alarm reporting systems, to the extent possible.

These and other objects are achieved in accordance with the present invention by providing an alarm reporting system having a local terminal comprised of a supervised derived channel communicator, and a one-way radio communicator, which are connected by a control unit which provides for interactive operation of the derived channel unit and the radio transmitter according to the alarm conditions which may arise at the premises, and the existing condition of the equipment comprising the local terminal unit.

Normally (with both units operational), the supervised derived channel unit operates to advise the associated central station of the conditions at the monitored premises. In the event of a failure of the derived channel unit, the radio transmitter is activated to advise the central station of the current status of the system. This alerts the central station to the failure, and also indicates the existing condition of the premises. If the premises are in proper condition, an equipment failure is indicated and steps are taken to repair the fault in due course. If there is an alarm condition at the premises, the central station will be advised of this by the radio transmitter, allowing appropriate measures to be taken. In the event that both units cease to operate, the central station is made aware of the simultaneous failure since the supervised, derived channel unit will cease to operate and the radio transmitter will not follow this cessation of activity with an appropriate report. This will result in a declared break-in. However, since the probability against both units failing simultaneously is extremely high, a declared break-in is justified.

Further in accordance with the present invention, the one-way radio communications which are used are preferably accomplished by means of the cellular telephone network. This not only provides the above-discussed operational functions, but also makes use of an existing network which is installed and serviced by third parties. Since actual use of the cellular telephone network is kept to a minimum as a result of the manner of operation of the system, the marginal costs of using the cellular telephone network are kept to a minimum. Moreover, use of the cellular telephone network has the added advantage of permitting simultaneous communications with both the central station which is monitoring the premises, as well as mobile units associated with the central station. Such mobile units may include mobile patrol vehicles, or mobile service vehicles, which can share in the responsibility of servicing a significant number of installations.

This results in an alarm system which is capable of providing a large number of subscribers with significant security, together with reduced response times, yet which can be installed at a minimal cost, and which is readily adaptable to existing alarm systems, including both derived channel and direct wired systems. Further detail regarding the construction of a supervised, interactive alarm reporting system in accordance with the present invention may be had with reference to the detailed description which is provided below, taken in conjunction with the following illustrations.

BRIEF DESCRIPTION OF THE DRAWINGS

In the several views provided, like reference numerals denote similar structure.

DETAILED DESCRIPTION OF THE PREFERRED EMBODIMENT

Figure 1:
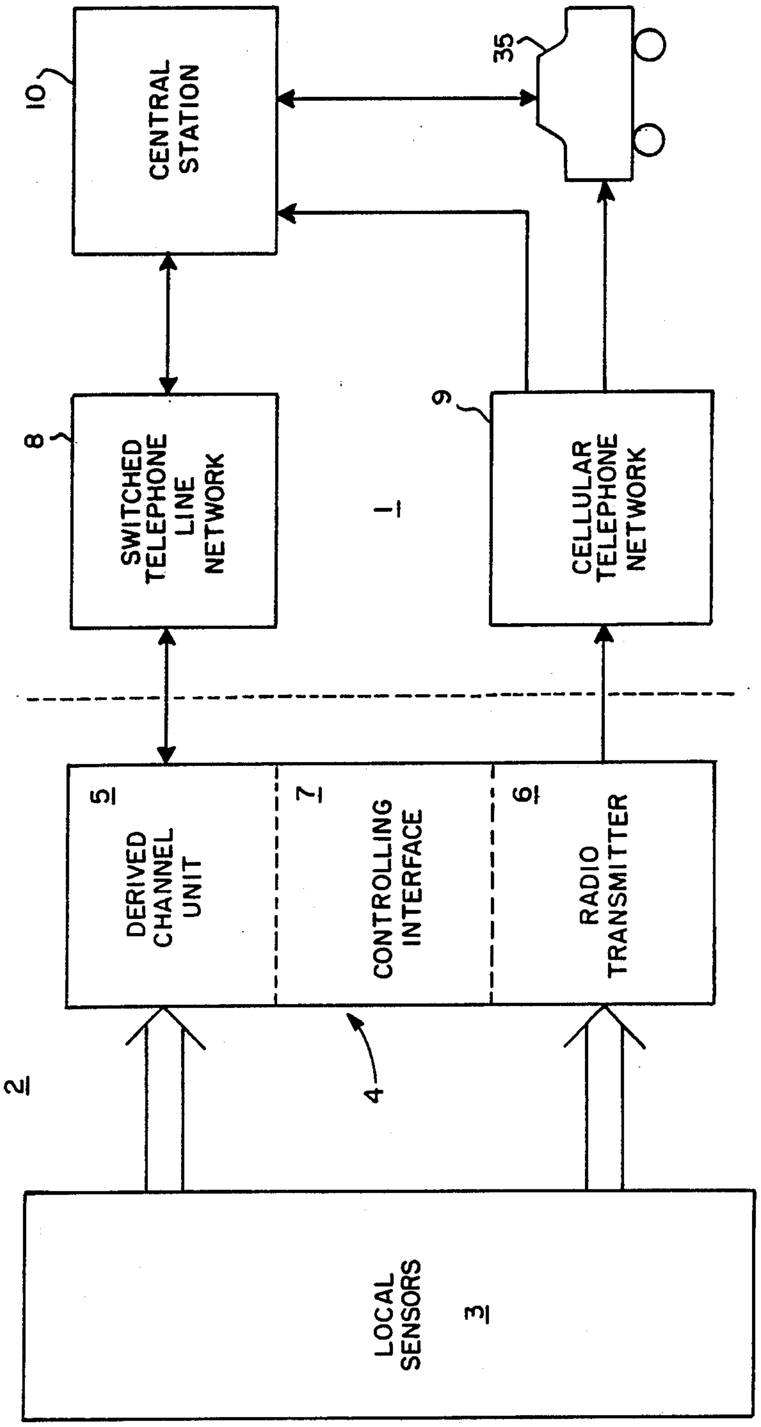
FIG. 1 is a schematic representation of the supervised, interactive alarm reporting system of the present invention.

FIG. 1 generally illustrates the supervised, interactive alarm reporting system 1 of the present invention. Those portions of the system 1 which are located at the premises 2 to be monitored generally include one or more sensors 3 which are capable of providing signals to a local terminal unit 4. Any of a variety of different types of sensors 3 may be used in connection with such a system, including smoke detectors, fire detectors, various detectors for determining intrusions such as contact switches, light sensitive circuits and ultrasonic circuits, as well as any of a number of parameter sensors such as temperature sensors, pressure sensors, timing devices or the like. To be noted in this regard is that only a single sensor may be provided, or any number of plural sensors may be utilized in operative combination. In any event, such sensors would be operatively connected to the local terminal unit 4 for ultimate (serial) processing as will be described more fully below.

The terminal unit 4 is essentially comprised of three interactive units. The first of these units is a derived channel unit 5 which is capable of communicating with a central station 10 via the switched telephone line network 8. Any of a variety of derived channel units 5 could be used for this purpose. However, in accordance with the present invention it is preferred that the derived channel unit 5 constitute a "Subscriber Terminal Unit" of the type manufactured by Base 10 Systems, Inc., Trenton, New Jersey. This unit is preferred in view of the supervisory capabilities which it provides. These supervisory capabilities are described with reference to U.S. Pat. No. 4,442,320, the subject matter of which is incorporated by reference as if fully set forth herein. The local terminal unit 4 also includes a radio transmitter 6 which is capable of communicating with the central station 10 by wireless communications. In accordance with the present invention, it is preferred that the radio transmitter 6 operate to transmit signals via the cellular telephone network 9 for reasons which will become apparent from the description which is provided below. Lastly, the local terminal unit 4 incorporates a controlling interface 7 which operatively connects the derived channel unit 5 and the radio transmitter 6 to provide a supervised, interactive alarm signal processor, the operation of which will now be more fully discussed.

Under normal operating conditions, it is expected that both the derived channel unit 5 and the radio transmitter 6 will be operational and functioning in their normal mode. In the preferred embodiment of the local terminal unit 4, the derived channel unit 5 is preferably a supervised unit, while the radio transmitter 6 is preferably configured as a non-supervised, one-way transmitter. The reason for this is that in the normal course of operations, the cost effective, supervised reporting capabilities of a derived channel unit 5 will be sufficient, and the relatively expensive cost of operating the radio transmitter 6 will be unnecessary. The supervised, derived channel unit 5 will therefore normally operate to keep the central station 10 advised as to the status of the premises 2, in cost effective fashion. Unless an alarm event is to be reported, the radio transmitter 6 will essentially remain dormant, keeping the impact (load) on the radio transmission network, in this case preferably the cellular telephone network, to a minimum. In addition to reducing costs, this allows a maximum number of local terminal units to be operatively associated with a particular central station without compromising the capabilities of such wireless communications.

It shall now be assumed that the derived channel unit 5 ceases to report. This may be the result of an equipment failure of the derived channel unit 5, an interruption or break in the switched telephone line network 8 due to servicing, accident or the like, or a potential break-in.

Figure 2:
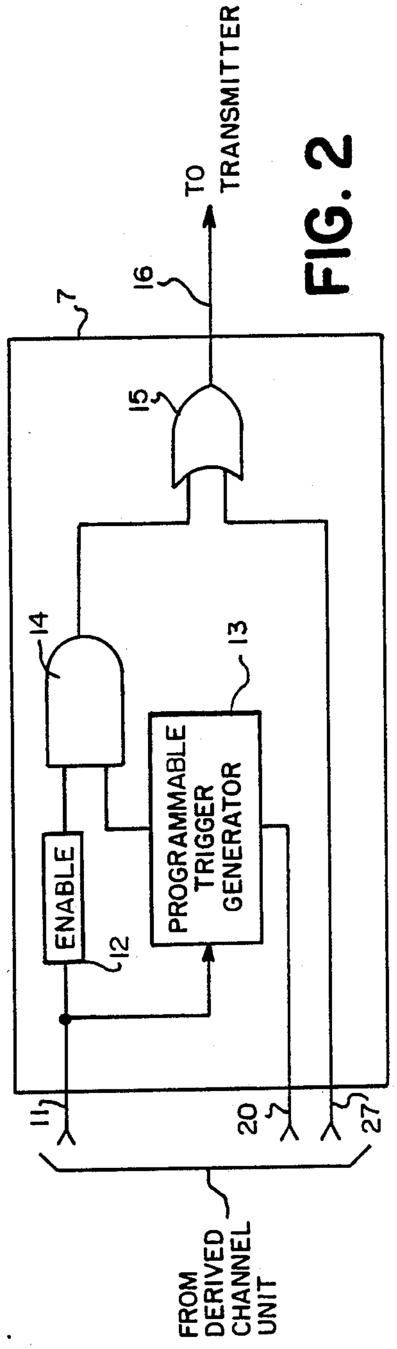
FIG. 2 is a schematic view showing the construction of the controlling interface.

In the event that the cessation of activity is the result of an equipment failure in the derived channel unit 5, the derived channel unit 5 will be unable to complete its supervisory interrogation sequence. As a result, the internal verification systems of the derived channel unit 5 (in this case the "Subscriber Terminal Unit" distributed by Base 10 Systems, Inc.) will provide an output indicating the occurrence of a fault. This output may then be used to develop a fault signal, which is applied at 11 in FIG. 2 of the drawings. The fault signal 11 is simultaneously applied to the input of an enabling circuit 12 and to the input of a programmable trigger generator 13. The enabling circuit and the programmable trigger generator are, in essence, monostable circuits which are capable of developing appropriate pulses responsive to the fault signal 11, as will be described more fully below, which are in turn applied to the first and second inputs of an AND circuit 14. Coincidence between the signals produced by the enabling circuit 12 and the programmable trigger generator 13 will cause an output to be developed at the AND circuit 14, which is then introduced to the first input of an OR circuit 15. This signal will in turn be passed through the OR circuit 15, for output at 16.

The output 16 is in turn applied to the radio transmitter 6, activating the radio transmitter 6. Activation of the radio transmitter 6 causes (preferably immediately) the status of the premises 2 to be transmitted to the central station 10 via the cellular telephone network 9. Accordingly, the central station 10 is made aware of the fault in the derived channel unit 5 of the terminal unit 4, and of the existing status of the sensors 3 associated with the premises 2. With this information, the central station 10 is able to make a decision as to whether or not there is an alarm condition which requires a response, or if there is simply a fault which requires eventual servicing. To be noted is that the radio transmitter 6 remains available to advise the central station 10 of any changes in the status of the local sensors 3 (i.e., alarm events).

As previously indicated, the radio transmitter 6 is preferably a non-supervised, one-way unit. Accordingly, after the initial transmission of information as previously described, the radio transmitter 6 could then be subject to tampering, without the central station 10 becoming aware of such tampering. However, by properly programming the programmable trigger generator 13, this problem can be overcome as follows.

Figure 3:
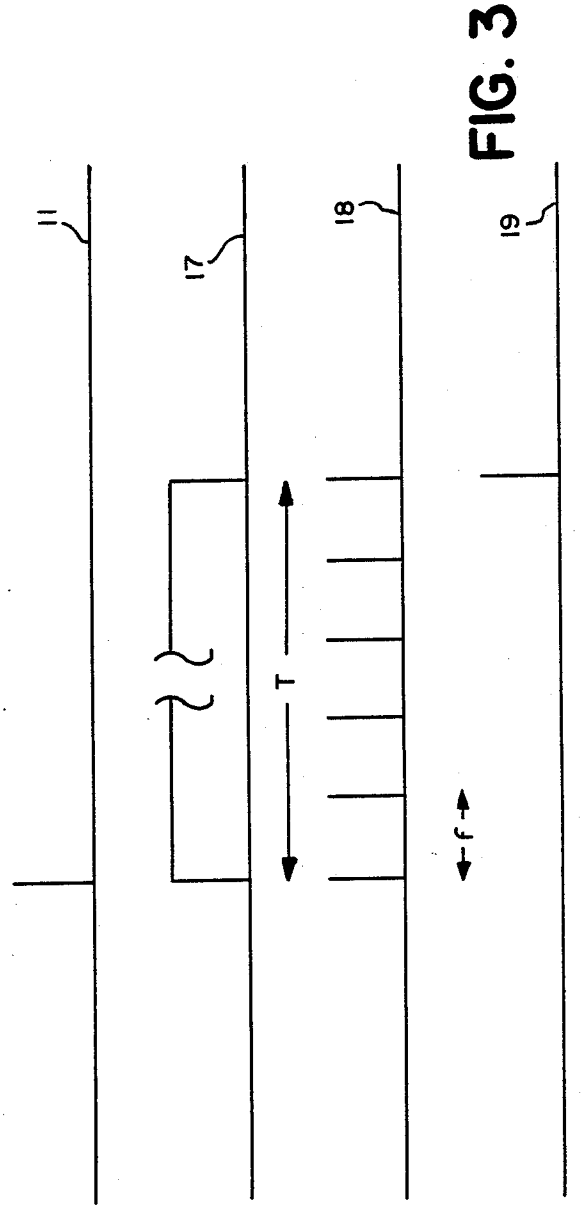
FIG. 3 is a timing diagram illustrating the interactive operation of the foregoing components.

Referring now to FIG. 3 of the drawings, various timing sequences associated with the controlling interface 7 are illustrated. As previously indicated, upon discontinuance of the operation of the derived channel unit 5, the fault signal 11 is produced. Responsive to the fault signal 11, the enabling circuit 12 operates to develop an enabling signal 17 for application to the first input of the AND circuit 14, while the programmable trigger generator 13 operates to develop its own programmed sequence for application to the second input of the AND circuit 14, as follows.

If it is only desired to provide a radio transmission upon the failure of the derived channel unit 5, the output of the programmable trigger generator 13 could be established in accordance with the sequence 11 illustrated in FIG. 3. This would provide an initial indication of the fault, and maintain radio communications, but would not provide any supervisory capabilities. In the event that supervisory capabilities are desired for enhanced security, the output of the programmable trigger generator 13 could be modified to establish the sequence 18 shown in FIG. 3. This would be accomplished by programming the programmable trigger generator 13 with a specified duration (T), frequency (f), and pulse width which are preferably variable (by the subscriber) to suit the user's specific requirements. Increasing the duration and/or frequency would increase the security provided, with an attendant increase in costs associated with the periodic excercise of the radio transmitter 6. Decreasing the duration and/or frequency would have the opposite effect. Nevertheless, a supervisory function would result as follows.

Assuming that the derived channel unit 5 has failed, the central station 10 will begin to receive communications from the radio transmitter 6. As will be discussed more fully below, the central station 10 is made aware of (programmed to expect) the periodic re-transmissions which are to occur in accordance with the selected sequence developed within the programmable trigger generator 13. The central station 10 will therefore be looking for these periodic transmissions to verify that the radio transmitter 6 has not been tampered with. This will also serve to periodically advise the central station 10 of the status of the premises 2. Failure to receive a scheduled transmission (or if desired, a contiguous pair of transmissions) will signify that the radio transmitter 6 is no longer operational. While this will cause the central station 10 to lose contact with the premises 2, the probability of a simultaneous failure of the derived channel unit 5 and the radio transmitter 6 is sufficiently small for the central station 10 to assume that there is a break-in at the premises 2 which warrants immediate attention. Suitable personnel could then be dispatched.

To be noted is that the periodic transmissions of the programmable trigger generator 13 could be continued for a significant period of time, if desired. Indeed, the periodic transmissions could be maintained indefinitely, provided the enabling signal 17 (which is provided to allow the installer of the system to limit radio supervision) is also correspondingly maintained, until such time as the derived channel unit 5 could be repaired.

Such periodic transmissions are accomplished as a result of the coincidence of the enabling signal 17 and one of the pulses developed by the programmable trigger generator 13, within the AND circuit 14. This provides a signal to the OR circuit 15, which will in turn be passed to the radio transmitter 6 as previously described. Upon correction of the fault within the derived channel unit 5, a restore signal such as is represented by the sequence 19 shown in FIG. 3 is provided to reset the programmable trigger generator 13, at 2 in FIG. 2. This operates to terminate the output at the AND circuit 14, restoring the terminal unit 4 to its normal operating condition.

Figure 4:
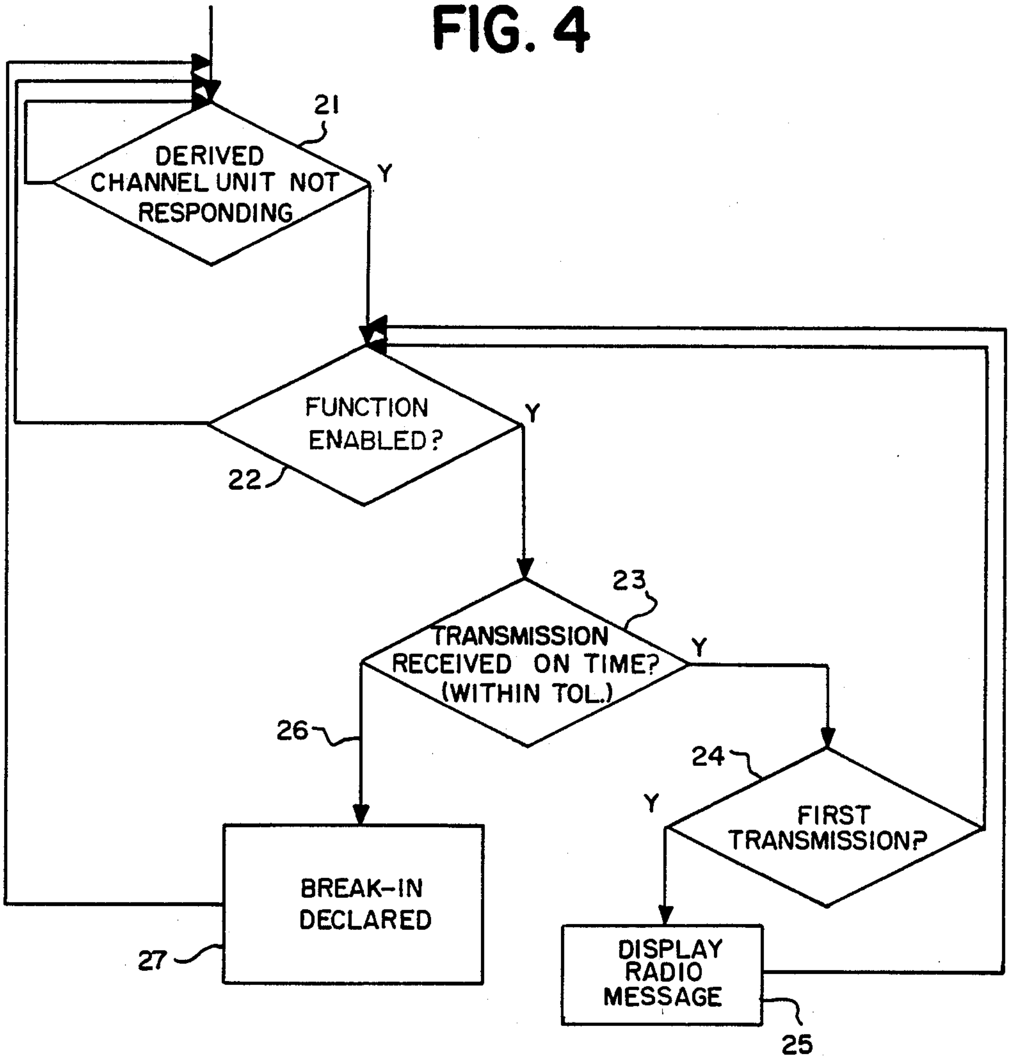
FIG. 4 is a flow diagram illustrating the steps taken at the central station to interpret the signals received from the local terminal unit.

As previously discussed, the foregoing operations must be complemented by operations at the central station 10 which serve to interpret the transmissions of the terminal unit 4. FIG. 4 illustrates the nature of these operations. As shown, activity at the central station 10 commences when it is determined that one of the derived channel units 5 is no longer responding, at 21. In such case, the central station 10 would then search for the corresponding radio transmission which is to result from the identified failure of the derived channel unit 5, if the particular subscriber is provided with such a capability, as determined at 22 (some subscribers may only be provided with supervised derived channel units, without the enhancement of a radio backup). Assuming that the subscriber has been provided with (has subscribed to) the alarm reporting system 1 of the present invention, a test is then made at 23 to determine whether or not the anticipated transmission has been received (within a defined tolerance). It will be understood that the timing of this test must therefore be programmed to correspond to the timing of the sequence entered into the programmable trigger generator 13, according to the requirements of the subscriber. Upon receiving the initial radio transmission from the terminal unit 4, which is detected at 24, a message 25 is displayed to alert the central station 10 of the failure of the derived channel unit 5 so that appropriate steps may be taken to repair the problem in due course. Subsequently, during a period of time established to correspond with the enabling signal 17, transmissions verifying continued operation of the radio transmitter 6 as previously described are then sought by returning to the test 22, and repeating the foregoing procedures. In the event that anticipated radio transmissions are not received, at 26, a break-in is declared at 27 and appropriate personnel are dispatched to the premises 2.

The foregoing assumes a failure of the derived channel unit 5. However, as previously indicated, the derived channel unit 5 may also cease to report due to an interruption or break in the switched telephone line network 8, or due to tampering in the course of a break-in. The first of these possibilities will result in a non-responding derived channel unit 5, causing further operations to proceed as previously described, until the fault with the communicating line is repaired. During the fault, the radio transmitter 6 will operate to keep the central station 10 advised of the status of the premises 2. Upon repair of the fault, re-established communications with the derived channel unit 5 will reset the terminal unit 4 (at the reset 20), returning the local terminal unit 4 to its normal operating condition. The second of these possibilities will cause an alarm condition to occur, which will be transmitted to the central station 10 by the radio transmitter 6, enabling appropriate personnel to be dispatched to the premises 2.

It shall now be assumed that the radio transmitter 6 has failed. In essence, the local terminal unit 4 need take no further action in such case since the derived channel unit 5 is fully supervised. Thus, the central station 10 remains in continuous contact with the premises 2, and is advised of its status. In the event that the derived channel unit 5 then ceases to operate, the central station 10 will not be able to proceed through the sequence previously described, since the initial radio transmission will not be received at the prescribed time. Again, since the probability of a simultaneous failure of the radio transmitter 6 and the derived channel unit 5 is quite low, a declared break-in is justified, and appropriate personnel are dispatched.

Figure 5:
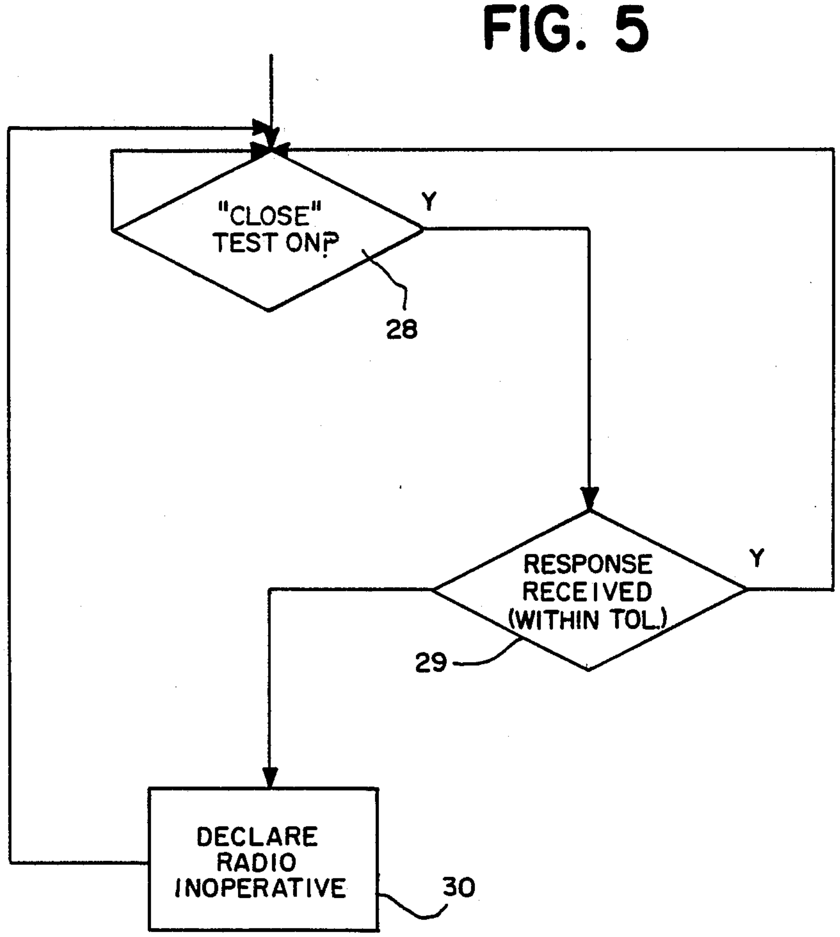
FIG. 5 is a flow diagram illustrating steps which may be taken at the central station to periodically test the integrity of the system.

The reliability, and therefore the predictability of this sequence can be further enhanced if the radio transmitter 6 is periodically tested to verify that it is operational. This may be accomplished by the testing procedure which is described with reference to FIG. 5. As previously indicated, the derived channel unit 5 is supervised, and is therefore periodically tested to verify its integrity. A test which is conventionally provided in connection with the earlier identified "Subscriber Terminal Unit" of Base 10 Systems, Inc. involves the periodic (usually each 24 hour period) transmission of a "close" signal to the "Subscriber Terminal Unit", which in turn provides an acknowledgment of this signal. This acknowledgment signal is also advantageously applied to the controlling interface 7, at 27, to provide a periodic check of the radio transmitter 6 by coupling the signal provided at 27 through the OR circuit 15 and to the radio transmitter 6. With reference to FIG. 5, this test is initiated at 28, followed by a check to verify receipt of the radio transmission (within a prescribed tolerance), at 29. If so, the test is complete until the next testing period. If not, the radio transmitter 6 is declared inoperative, at 30, and steps are taken to dispatch appropriate personnel to repair the unit. Other available signals may be used, as desired, to perform similar testing of this nature.

Of course, in the event that both the derived channel unit 5 and the radio transmitter 6 cease to function, a presumption is made that a significant problem exists at the premises 2, and a break-in is immediately declared. Appropriate personnel are then dispatched to the premises 2 to deal with the situation. However, the derived channel unit 5 and the radio transmitter 6 are preferably provided with a battery back-up to account for power failures and the like, so that the probability of a simultaneous equipment failure will be extremely low. This allows the break-in to be declared with a high degree of reliability, avoiding false alarms.

Accordingly, as a result of the foregoing operations the central station 10 is kept fully advised of the status of the premises 2, even during equipment failures. Conditions are maintained which allow the premises to be monitored, even if there has been significant tampering. Due to the redundancy of the system, significant tampering can practically speaking be the only cause of a system failure (other than a failure of one of the sensors 3 or at the central station 10), allowing a break-in to be declared with confidence. To be noted is that this is accomplished with only minimal use of the wireless system, keeping costs to a minimum and avoiding possible overtaxing of the wireless transmission system.

The use of wireless communications as previously described, particularly making use of the cellular telephone network, provides yet another enhancement to security as follows. In accordance with those operations previously described, equipment failures other than those involving the radio transmitter 6 will cause a radio transmission to be made. However, the signal which is transmitted to the central station 10 is also potentially receivable at other places. For this reason, and in accordance with the present invention, the supervised, interactive alarm reporting system 1 of the present invention is preferably further provided with mobile units 35 which are capable of supplementing the above described functions. Faults in equipment encountered at the premises 2 can therefore immediately be conveyed to a mobile unit 35, which is in a position to even more promptly respond to the potential problem. This can even eliminate the need for the central station 10 to get in contact with the personnel which are needed to accomplish the necessary repairs (possibly even eliminating the need for the central station 10 itself), leading to a significant savings in response time. Nevertheless, it is considered advantageous for the mobile units 35 to be in contact with the central station 10, a capability which is again advantageously achieved through the cellular telephone network 9.

Yet another enhancement results in causing the radio transmitter 6 to operate, in parallel with the derived channel unit 5, each time an alarm condition is detected at the premises 2. This serves to immediately advise the mobile units 35 of the detected alarm, allowing an immediate and positive response in the shortest possible time period.

Thus, the mobile units 35 can include service vehicles for correcting faults in the system and/or security vehicles for responding to alarms or declared break-ins. This capability is provided without additionally taxing the cellular telephone network 9 or the remaining components of the alarm reporting system 1. Although voice communications are possible, the foregoing capabilities are advantageously achieved by provided the mobile units 35 with an appropriate computer/transceiver. Such a computer/transceiver may be developed by combining a suitable portable computer with a mobile converter such as is presently marketed by the Motorola Corporation. In either case, the mobile units 35 are immediately advised of the situation at the premises 2, whether to take immediate action in accordance with the received message, or to get in contact with the central station 10 to determine a proper course of action.

It will therefore be seen that the above described supervised, interactive alarm reporting system serves to satisfy each of the objectives previously set forth. Moreover, the described system can be implemented without having to modify the existing alarm reporting system of the premises (i.e., the derived channel unit 5). It will further be understood that the supervised, interactive alarm reporting system of the present invention is capable of being modified without departing from the spirit and scope of the present invention.

Many of these variations have previously been described in connection with the various specific elements of the system. It is further to be understood that any of a variety of available derived channel units 5 or radio transmitters 6 could be used apart from those which have been described as preferred for use in connection with the system 1 of the present invention. One such variation which is particularly noteworthy is an alternative configuration which makes use of two-way radio communications in combination with a digital communicator. This system is effectuated similar to the system previously described, by substituting the two-way radio for the derived channel unit 5, and by substituting the digital communicator for the radio transmitter 6. Operation of the resulting unit, and the resulting benefits, would proceed as previously described.

Yet another variation allows significant security to be provided for mobile sites such as land vehicles, aircraft, and sea vessels. To this end, the mobile site may be provided with a desired security system (theft, fire, etc.), the local terminal of which is then placed in communication with a central station or mobile security units via the cellular telephone network. This allows the mobile site to appropriately report its condition, irrespective of its location, and even while moving.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A supervised, interactive alarm reporting system for providing communication between one or more event sensors associated with a premises, and a central facility for monitoring sensors at said premises, comprising:

first means for establishing communication between said sensors and said central facility using wired communicating lines;

second means for establishing communication between said sensors and said central facility using radio transmission; and means connecting said first means and said second means for controlling operation of the first means and the second means according to the condition of at least said first means, independent of the condition of said one or more event sensors;

wherein said first means is a derived channel unit and said second means is a radio transmitter, and wherein said connecting means operates to establish communication with said central facility using said derived channel unit during normal operating conditions;

wherein said derived channel unit is coupled with means for determining a fault in communication with said central facility, and for providing said connecting means with a fault signal for causing said radio transmitter to operate;

wherein said connecting means continues to operate said radio transmitter in the presence of said fault signal to provide periodic radio transmission according to a preselected timing sequence; and wherein said central facility includes means for searching for said periodic radio transmission responsive to the detection of said fault in communication.

2. The system of claim 1 wherein said derived channel unit is supervised.

3. The system of claim 1 wherein said first means operates via a switched telephone line network.

4. The system of claim 1 wherein said second means is unsupervised.

5. The system of claim 4 wherein said second means is a transmitter only.

6. The system of claim 4 wherein said second means operates via a cellular telephone network.

7. The system of claim 1 wherein said communication is supervised by said central facility.

8. The system of claim 1 wherein said connecting means operates to establish communication with said central facility using said radio transmitter, during a sensed alarm event.

9. The system of claim 1 wherein said continued operation includes a radio transmission occurring responsive to a sensed alarm event.

10. The system of claim 1 wherein said preselected timing sequence is variable in frequency and duration.

11. The system of claim 1 wherein said searching is accomplished by means for determining the coincidence of said periodic radio transmission and said preselected timing sequence.

12. The system of claim 1 wherein said derived channel unit includes means for resetting said connecting means upon cessation of said fault in communications with said central facility, returning said system to said normal operating conditions.

13. The system of claim 1 wherein said central facility is fixed in location.

14. The system of claim 13 which further includes a mobile unit in communication with said alarm reporting system.

15. The system of claim 14 wherein said mobile unit is in communication with the second means of said alarm reporting system.

16. The system of claim 14 wherein said mobile unit is in communication with said central facility.

17. The system of claim 1 wherein said connecting means includes means for selecting between said first means and said second means, irrespective of the condition of said one or more event sensors.

18. The system of claim 1 wherein said connecting means controls the operation of said first means and said second means at times other than an event sensed by said one or more event sensors.

19. The system of claim 18 wherein said sensed event is a fault in said one or more event sensors.

20. The system of claim 1 which further includes means for testing said alarm reporting system from said central facility.

21. The system of claim 20 wherein said radio transmitter is tested from said central facility.

22. The system of claim 20 wherein said derived channel unit is tested from said central facility.

23. The system of claim 1 wherein said one or more event sensors are simultaneously connected with said first means and said second means.

24. A supervised, interactive alarm reporting system for providing communication between one or more event sensors associated with a premises, and a central facility for monitoring sensors at said premises, comprising:

first means for establishing communication between said sensors and said central facility using wired communicating lines;

second means for establishing communication between said sensors and said central facility using radio transmissions; and means connecting said first means and said second means for controlling operation of the first means and the second means according to the condition of at least said first means, independent of the condition of said one or more event sensors;

wherein said first means is a derived channel unit and said second means is a radio transmitter, and wherein said connecting means operates to establish communication with said central facility using said derived channel unit during normal operating conditions; and wherein said connecting means includes means for periodically testing said radio transmitter responsive to periodic testing associated with said derived channel unit.

25. The system of claim 24 wherein said testing is performed from said central facility.

* * * * *